(12) United States Patent
Nagatoshi

(10) Patent No.: US 10,871,638 B2
(45) Date of Patent: Dec. 22, 2020

(54) IMAGING OPTICAL SYSTEM, PROJECTION DISPLAY DEVICE, AND IMAGING APPARATUS

(71) Applicant: FUJIFILM Corporation, Tokyo (JP)

(72) Inventor: Yukiko Nagatoshi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 159 days.

(21) Appl. No.: 16/133,537

(22) Filed: Sep. 17, 2018

(65) Prior Publication Data

US 2019/0094504 A1 Mar. 28, 2019

(30) Foreign Application Priority Data

Sep. 28, 2017 (JP) ................. 2017-187416

(51) Int. Cl.
*G02B 13/22* (2006.01)
*G02B 13/18* (2006.01)
*G02B 13/16* (2006.01)
*G02B 13/00* (2006.01)
*G02B 13/04* (2006.01)
*G02B 27/14* (2006.01)

(52) U.S. Cl.
CPC ......... *G02B 13/22* (2013.01); *G02B 13/0045* (2013.01); *G02B 13/04* (2013.01); *G02B 13/16* (2013.01); *G02B 13/18* (2013.01); *G02B 27/149* (2013.01)

(58) Field of Classification Search
CPC ........ G02B 13/22; G02B 13/16; G02B 13/04; G02B 13/18; G02B 13/0045; G02B 9/60; G02B 9/62; G02B 9/64
USPC ......................... 359/649–651, 663
See application file for complete search history.

(56) References Cited

U.S. PATENT DOCUMENTS

| | | | |
|---|---|---|---|
| 2010/0172022 A1* | 7/2010 | Lin | G02B 13/16 359/434 |
| 2010/0290133 A1 | 11/2010 | Sano et al. | |
| 2011/0002046 A1 | 1/2011 | Wada et al. | |
| 2011/0032606 A1 | 2/2011 | Imaoka | |

(Continued)

FOREIGN PATENT DOCUMENTS

| | | |
|---|---|---|
| JP | H10-319314 A | 12/1998 |
| JP | 2010-266577 A | 11/2010 |
| JP | 2011-013469 A | 1/2011 |

(Continued)

OTHER PUBLICATIONS

An Office Action mailed by the Japanese Patent Office dated May 19, 2020, which corresponds to Japanese Patent Application No. 2017-187416 and is related to U.S. Appl. No. 16/133,537.

*Primary Examiner* — Jordan M Schwartz
(74) *Attorney, Agent, or Firm* — Studebaker & Brackett PC

(57) ABSTRACT

The imaging optical system consists of, in order from the magnification side, a first optical system forming an intermediate image and a second optical system re-forming the intermediate image, and is configured to be telecentric on the reduction side. The imaging optical system satisfies predetermined conditional expressions relating to a ray height on a lens surface closest to the magnification side in the second optical system, a ray height on a lens surface closest to the reduction side in the first optical system, and heights of rays at a position where a principal ray with the maximum angle of view intersects with the optical axis in the second optical system.

12 Claims, 12 Drawing Sheets

EXAMPLE 1

(56) References Cited

U.S. PATENT DOCUMENTS

2015/0323767 A1 11/2015 Morikuni et al.
2019/0166329 A1* 5/2019 Shiokawa ............ G03B 21/142

FOREIGN PATENT DOCUMENTS

| JP | 2011-053663 A | 3/2011 |
| JP | 2015-215478 A | 12/2015 |
| JP | 2016-143032 A | 8/2016 |
| JP | 2017-215503 A | 12/2017 |
| WO | WO 2018/117209 A1 * | 6/2018 |

* cited by examiner

EXAMPLE 1

EXAMPLE 2

EXAMPLE 3

EXAMPLE 3

IMAGING OPTICAL SYSTEM, PROJECTION DISPLAY DEVICE, AND IMAGING APPARATUS

CROSS-REFERENCE TO RELATED APPLICATIONS

The present application claims priority under 35 U.S.C. § 119 to Japanese Patent Application No. 2017-187416, filed on Sep. 28, 2017. The above application is hereby expressly incorporated by reference, in its entirety, into the present application.

BACKGROUND OF THE INVENTION

1. Field of the Invention

The present invention relates to an imaging optical system, a projection display device, and an imaging apparatus.

2. Description of the Related Art

In the past, projection display devices, each of which projects an image displayed on a light valve such as a liquid crystal display element or a Digital Micromirror Device (DMD: registered trademark) onto a screen or the like in an enlarged manner, have come into widespread use. In a projection imaging optical system used in combination with a light valve in a projection display device, it has been demanded that aberration correction appropriate for the resolution of the light valve is satisfactorily performed in response to recent improvement in performance of the light valve.

Examples of the imaging optical system applicable to known projection display devices include an optical system described in JP2016-143032A. JP2016-143032A discloses an optical system in which a second optical system consisting of a plurality of lenses on the reduction side forms an intermediate image and a first optical system consisting of a plurality of lenses on the magnification side projects the intermediate image in an enlarged manner.

SUMMARY OF THE INVENTION

Recently, in consideration of using a projection display device in a relatively narrow indoor space for presentation use or the like, there is a demand for a projection imaging optical system having a wider angle. In addition to the above demands, there is also a demand for reducing the costs of the projection display device. Accordingly, a demand for reducing the costs of the imaging optical system mounted on the projection display device is getting stronger.

However, in the optical system described in JP2016-143032A, a lot of lenses with large outer diameters are arranged in the vicinity of the intermediate image of the first optical system, and thus its cost is high.

The present invention has an object to provide an imaging optical system that has a wide angle of view and has excellent optical performance by minimizing the lens outer diameter and achieving reduction in costs as an optical system that forms an intermediate image, a projection display device that has this imaging optical system, and an imaging apparatus including this imaging optical system.

In order to solve the above-mentioned problems, an imaging optical system comprises, in order from a magnification side to a reduction side: a first optical system that has at least one lens and forms an intermediate image at a position conjugate to a magnification side imaging surface; and a second optical system that has at least one lens and re-forms the intermediate image on a reduction side imaging surface. The imaging optical system is configured to be telecentric on the reduction side. Assuming that a height of a principal ray with a maximum angle of view on a lens surface closest to the magnification side in the second optical system is $hkc2$, a height of the principal ray with the maximum angle of view on a lens surface closest to the reduction side in the first optical system is $hrc1$, a height of an on-axis marginal ray of the lens surface closest to the magnification side in the second optical system is $hkm2$, and a height of the on-axis marginal ray at a position where the principal ray with the maximum angle of view intersects with an optical axis in the second optical system is $hs$, Conditional Expressions (1) and (2) are satisfied.

$$1.5 < hkc2/hrc1 \quad (1)$$

$$hkm2/hs < 0.8 \quad (2)$$

In the imaging optical system of the present invention, it is preferable to satisfy at least one of Conditional Expression (1-1) or (2-1).

$$1.8 < hkc2/hrc1 < 2.5 \quad (1-1)$$

$$0.4 < hkm2/hs < 0.7 \quad (2-1)$$

In the imaging optical system of the present invention, assuming that an absolute value of an angle formed between the principal ray with the maximum angle of view incident on the lens closest to the magnification side in the second optical system and the principal ray with the maximum angle of view emitted from the lens closest to the magnification side in the second optical system is $\theta$ where a unit of $\theta$ is degrees, it is preferable to satisfy Conditional Expression (3), and it is more preferable to satisfy Conditional Expression (3-1).

$$14 < \theta \quad (3)$$

$$16 < \theta < 20 \quad (3-1)$$

In the imaging optical system of the present invention, it is preferable that a lens closest to the reduction side in the first optical system is an aspheric lens. In addition, assuming that a height of the principal ray with the maximum angle of view on a magnification side surface of the aspheric lens is $yk$, a height of the principal ray with the maximum angle of view on a reduction side surface of the aspheric lens is $yr$, an amount of deviation between the magnification side surface of the aspheric lens and a paraxial spherical surface of the surface in a direction of the optical axis at the height $yk$ is $Xk(yk)$, an amount of deviation between the reduction side surface of the aspheric lens and a paraxial spherical surface of the surface in the direction of the optical axis at the height $yr$ is $Xr(yr)$, a sign of $Xk(yk)$ is negative in a case where the magnification side surface of the aspheric lens at the height $yk$ is closer to the magnification side than the paraxial spherical surface of the surface and is positive in a case where the magnification side surface is closer to the reduction side than the paraxial spherical surface, a sign of $Xr(yr)$ is negative in a case where the reduction side surface of the aspheric lens at the height $yr$ is closer to the magnification side than the paraxial spherical surface of the surface and is positive in a case where the reduction side surface is closer to the reduction side than the paraxial spherical surface, and a focal length of a whole system is $f$, it is preferable to satisfy Conditional Expression (4), and it is more preferable to satisfy Conditional Expression (4-1).

$$0 < [Xr(yr) - Xk(yk)]/|f| \qquad (4)$$

$$0.3 < [Xr(yr) - Xk(yk)]/|f| < 1 \qquad (4\text{-}1)$$

In the imaging optical system of the present invention, assuming that a maximum image height on the reduction side imaging surface is Ymax and a height of the principal ray with the maximum angle of view on a lens surface closest to the reduction side in the first optical system is hrc1, it is preferable to satisfy Conditional Expression (5).

$$0.8 < Y\max/hrc1 < 1.5 \qquad (5)$$

A projection display device of the present invention comprises: a light source; a light valve into which light emitted from the light source is incident; and the imaging optical system of the present invention. It is preferable that the imaging optical system projects an optical image using modulated light, which is modulated through the light valve, onto a screen.

An imaging apparatus of the present invention comprises the imaging optical system of the present invention.

In a case where the imaging optical system of the present invention is applied to a projection display device, the "magnification side" means a projection target side (screen side), and the "reduction side" means an original image display region side (light valve side).

In the present description, it should be noted that the terms "consisting of ~" and "consists of ~" mean that the lens may include not only the above-mentioned elements but also lenses substantially having no powers, optical elements, which are not lenses, such as a stop, a filter, and a cover glass, and mechanism parts such as a lens flange, a lens barrel, an imaging element, and a camera shaking correction mechanism.

The sign of the refractive power in the present specification is to be considered in terms of the paraxial region unless otherwise noted. Further, the values used in the above conditional expressions are values in a case where the distance from the magnification side imaging surface to the lens surface closest to the magnification side is set to be infinite and the d line (a wavelength of 587.6 nm (nanometers)) is set as a reference.

According to the present invention, the optical system that forms an intermediate image is configured to satisfy predetermined conditional expressions. With such a configuration, it is possible to provide an imaging optical system that has a wide angle of view and has excellent optical performance by minimizing the lens outer diameter and achieving reduction in costs, a projection display device that has this imaging optical system, and an imaging apparatus including this imaging optical system.

DESCRIPTION OF THE PREFERRED EMBODIMENTS

Figure 1:
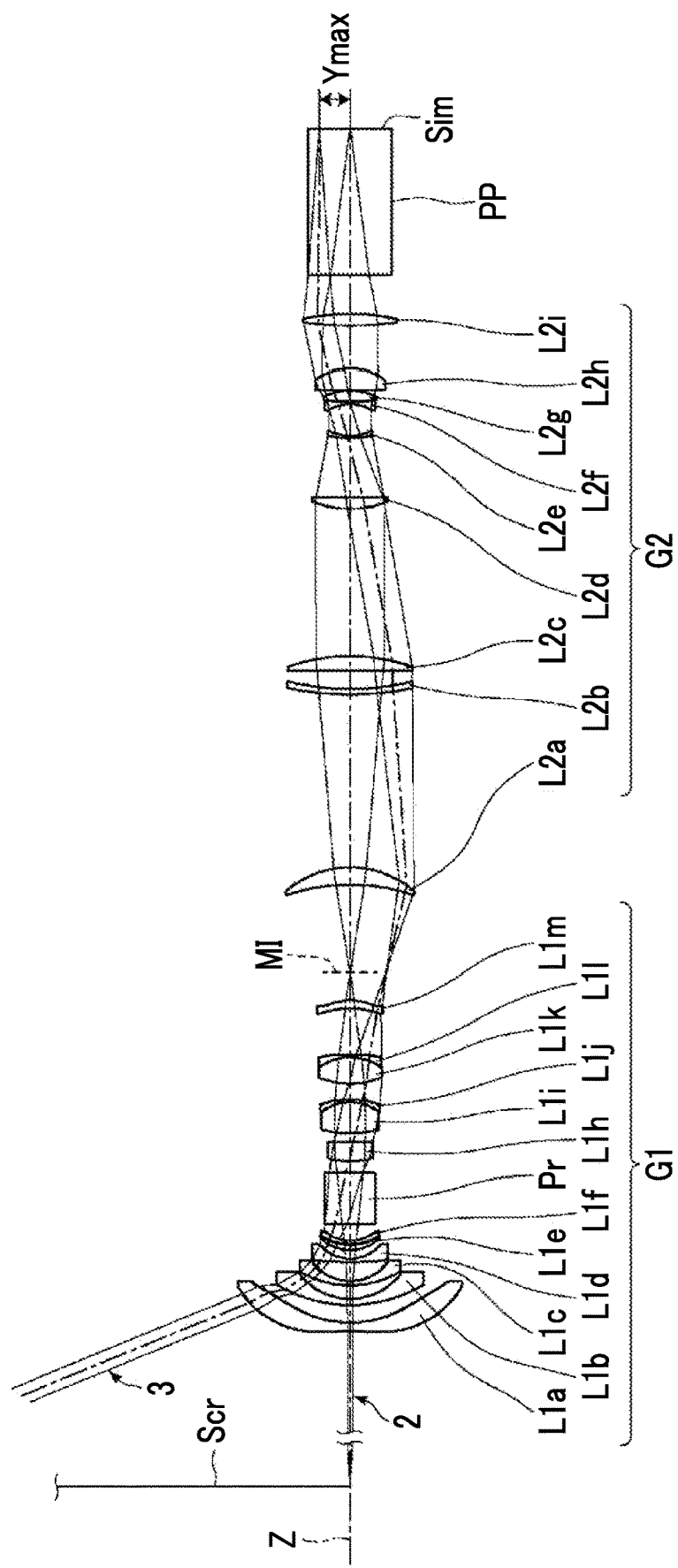
FIG. 1 is a cross-sectional view illustrating a configuration and rays of an imaging optical system (imaging optical system of Example 1 of the present invention) according to an embodiment of the present invention.

Hereinafter, embodiments of the present invention will be described in detail with reference to the drawings. FIG. 1 is a cross-sectional view illustrating a configuration of an imaging optical system according to an embodiment of the present invention. The exemplary configuration shown in FIG. 1 corresponds to Example 1 to be described later. In FIG. 1, the left side is the magnification side, and the right side is the reduction side, and on-axis rays 2 and rays with the maximum angle of view 3 are also shown.

The imaging optical system is an optical system that forms an intermediate image at a position conjugate to a reduction side imaging surface and forms the intermediate image again on a magnification side imaging surface. This imaging optical system is an optical system suitable as a projection optical system used for a projection display device and an imaging optical system used for a digital camera or the like.

In FIG. 1, assuming that the projection optical system is mounted on a projection display device, a screen Scr, an optical member PP, and an image display surface Sim of a light valve are also illustrated. The optical member PP is a member whose incident surface and exit surface are parallel. The optical member PP is a member such as a filter, a cover glass or a color synthesizing prism. The optical member PP is not an indispensable component, and the optical member PP may be configured to be omitted. It should be noted that FIG. 1 shows a configuration example in which a position of a reduction side surface of the optical member PP coincides with a position of the image display surface Sim, but such a configuration in which the positions are different may be possible.

In the projection display device, rays, which are made to have image information through the image display surface Sim, are incident into the imaging optical system through the optical member PP, and are transmitted onto a screen Scr through the imaging optical system. That is, in the example of FIG. 1, the image display surface Sim corresponds to the reduction side imaging surface, and the screen Scr corresponds to the magnification side imaging surface.

The imaging optical system consists of, in order from a magnification side to a reduction side: a first optical system G1 that has at least one lens and forms an intermediate image M1 at a position conjugate to a magnification side imaging surface; and a second optical system G2 that has at least one lens and re-forms the intermediate image MI on a reduction side imaging surface. That is, the imaging optical system consists of the first optical system G1, which is disposed on the magnification side, and the second optical system G2, which is disposed on the reduction side, with a forming position of the intermediate image MI interposed therebetween. In FIG. 1, only a part of the intermediate image MI including the vicinity of the optical axis is conceptually indicated by the dotted line, and the position thereof in the direction of the optical axis is shown on the basis of the position in the vicinity of the optical axis.

In the imaging optical system configured to form the intermediate image MI, it is possible to reduce a back focal length of the first optical system G1, and it is possible to reduce a lens diameter of the first optical system G1 on the magnification side. As a result, the system can be configured to be appropriate for achieving a wide angle by reducing the focal length of the whole system. Consequently, in the imaging optical system that forms the intermediate image MI, it is possible to reduce the lens diameter on the magnification side even in an optical system having a wide angle of view.

The imaging optical system is configured to be telecentric on the reduction side. In a case where the imaging optical system and a color synthesizing prism are used in combination in the projection display device, the spectrum characteristics of the color synthesizing prism vary depending on an angle of the incidence ray. Thus, it is desired that the imaging optical system is configured to be telecentric on the reduction side.

Here, the term "telecentric on the reduction side" indicates a state where the bisector of a maximum ray on the upper side and a maximum ray on the lower side is substantially parallel to the optical axis Z in the cross section of the rays converging on an optional point of the image display surface Sim which is the reduction side imaging surface, as the rays are viewed from the magnification side to the reduction side. The substantially parallel state described herein is in a state in which the inclination of the bisector with respect to the optical axis Z is in the range of −3° to +3°.

In the imaging optical system, assuming that a height of a principal ray with a maximum angle of view on a lens surface closest to the magnification side in the second optical system G2 is hkc2, a height of the principal ray with the maximum angle of view on a lens surface closest to the reduction side in the first optical system G1 is hrc1, a height of an on-axis marginal ray of the lens surface closest to the magnification side in the second optical system G2 is hkm2, and a height of the on-axis marginal ray at a position where the principal ray with the maximum angle of view intersects with an optical axis Z in the second optical system G2 is hs, Conditional Expressions (1) and (2) are satisfied.

$$1.5 < hkc2/hrc1 \qquad (1)$$

$$hkm2/hs < 0.8 \qquad (2)$$

Figure 2:
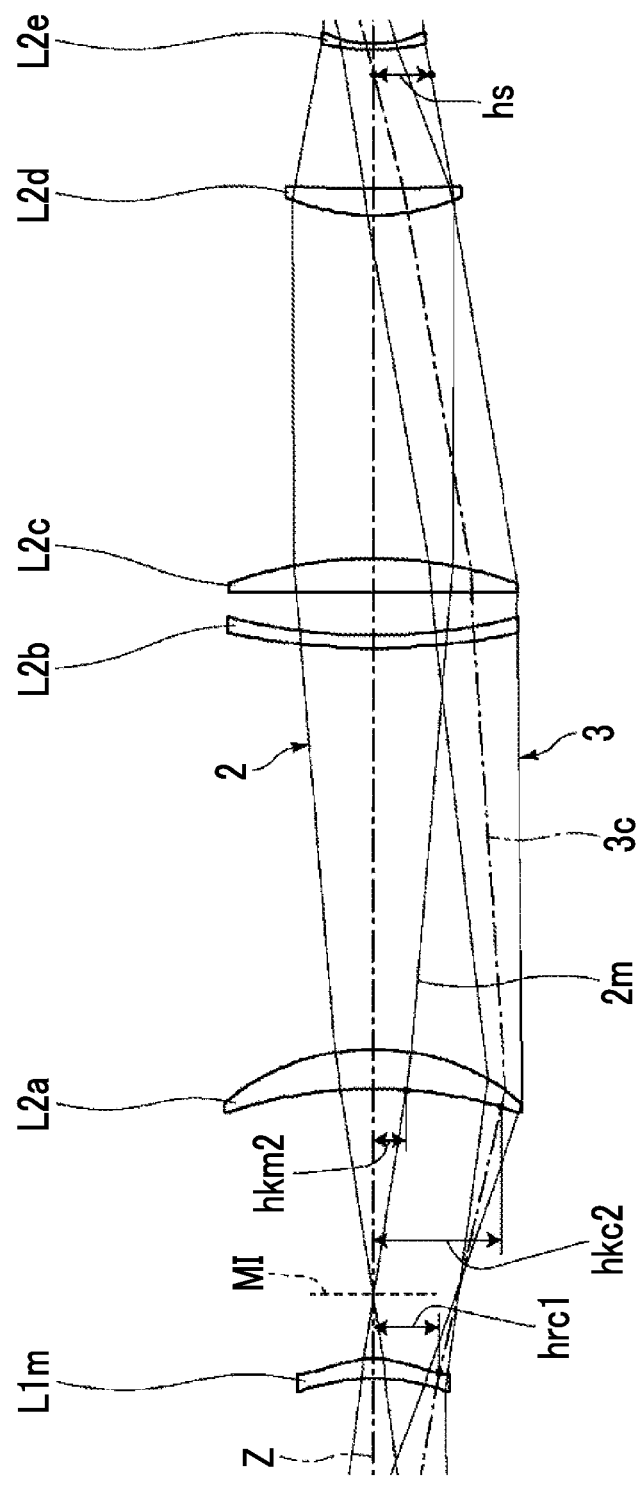
FIG. 2 is a partially enlarged view for explaining symbols of Conditional Expressions (1) and (2).

Further, FIG. 2 shows a partially enlarged view of the imaging optical system of FIG. 1. FIG. 2 exemplifies an on-axis marginal ray 2m and a principal ray 3c with the maximum angle of view. In addition, FIG. 2 exemplifies hkc 2, hrc 1, hkm 2, and hs mentioned above.

By not allowing the result of Conditional Expression (1) to be equal to or less than the lower limit, the diameter of the lens in the vicinity of the intermediate image MI of the first optical system G1 is prevented from becoming large. Thus, it is possible to achieve reduction in costs. Further, it is preferable to satisfy Conditional Expression (1-1). By not allowing the result of Conditional Expression (1-1) to be equal to or less than the lower limit, it is possible to increase an effect of Conditional Expression (1). By not allowing the result of Conditional Expression (1-1) to be equal to or greater than the upper limit, it is possible to suppress an increase in total length of the second optical system G2.

$$1.8 < hkc2/hrc1 < 2.5 \qquad (1\text{-}1)$$

By not allowing the result of Conditional Expression (2) to be equal to or greater than the upper limit, it is possible to suppress an increase in spherical aberration and an increase in longitudinal chromatic aberration. Further, it is preferable to satisfy Conditional Expression (2-1). By not allowing the result of Conditional Expression (2-1) to be equal to or greater than the upper limit, it is possible to increase an effect of Conditional Expression (2). By not allowing the result of Conditional Expression (2-1) to be equal to or less than the lower limit, it is possible to suppress an increase in total length.

$$0.4 < hkm2/hs < 0.7 \qquad (2\text{-}1)$$

Further, in the imaging optical system, assuming that an absolute value of an angle formed between the principal ray with the maximum angle of view incident on the lens closest to the magnification side in the second optical system G2 and the principal ray with the maximum angle of view emitted from the lens closest to the magnification side in the second optical system G2 is θ where a unit of θ is degrees, it is preferable to satisfy Conditional Expression (3).

$$14 < \theta \qquad (3)$$

By not allowing the result of Conditional Expression (3) to be equal to or less than the lower limit, the lens diameter of the first optical system G1 is prevented from becoming large. Thus, it is possible to achieve reduction in costs. Further, it is preferable to satisfy Conditional Expression (3-1). By not allowing the result of Conditional Expression (3-1) to be equal to or less than the lower limit, it is possible to increase an effect of Conditional Expression (3). By not allowing the result of Conditional Expression (3-1) to be equal to or greater than the upper limit, it is possible to suppress occurrence of spherical aberration.

$$16 < \theta < 20 \qquad (3\text{-}1)$$

Further, it is preferable that the imaging optical system is an aspheric lens in which a lens closest to the reduction side in the first optical system G1 has at least one aspheric surface. In such a case, by disposing an aspheric surface near the image plane of the intermediate image MI, it is possible to obtain an effect excellent in correcting distortion and field curvature which are problematic in the wide angle lens. Furthermore, this imaging optical system has a configuration in which the intermediate image MI is formed and Conditional Expressions (1) and (2) are satisfied. Thus, as described above, it is possible to prevent the diameter of the lens near the intermediate image MI of the first optical system G1 from increasing. Consequently, in a case where the lens closest to the reduction side in the first optical system G1 is an aspheric lens, it is possible to prevent the diameter of the aspheric lens from increasing. As a result, it is possible to prevent the diameter of the aspheric surface from increasing. Therefore, it is possible to make the aspheric lens inexpensive while correcting aberrations.

The lens closest to the reduction side in the first optical system G1 is an aspheric lens. In addition, assuming that a focal length of a whole system is f, a height of the principal ray with the maximum angle of view on a magnification side surface of the aspheric lens is yk, a height of the principal ray with the maximum angle of view on a reduction side surface of the aspheric lens is yr, an amount of deviation between the magnification side surface of the aspheric lens and a paraxial spherical surface of the surface in a direction of the optical axis Z at the height yk is Xk(yk), and an amount of deviation between the reduction side surface of the aspheric lens and a paraxial spherical surface of the surface in the direction of the optical axis Z at the height yr is Xr(yr), it is preferable to satisfy Conditional Expression (4).

$$0<[Xr(yr)-Xk(yk)]/|f| \qquad (4)$$

Here, a sign of Xk(yk) is negative in a case where the magnification side surface of the aspheric lens at the height yk is closer to the magnification side than the paraxial spherical surface of the surface and is positive in a case where the magnification side surface is closer to the reduction side than the paraxial spherical surface, and a sign of Xr(yr) is negative in a case where the reduction side surface of the aspheric lens at the height yr is closer to the magnification side than the paraxial spherical surface of the surface and is positive in a case where the reduction side surface is closer to the reduction side than the paraxial spherical surface.

By not allowing the result of Conditional Expression (4) to be equal to or less than the lower limit, the refractive power at the peripheral portion of the aspheric lens is prevented from becoming excessively strong. Thus, it becomes easy to correct field curvature and astigmatism. Further, it is preferable to satisfy Conditional Expression (4-1). By not allowing the result of Conditional Expression (4-1) to be equal to or less than the lower limit, it is possible to increase an effect of Conditional Expression (4). By not allowing the result of Conditional Expression (4-1) to be equal to or greater than the upper limit, the refractive power of the aspheric lens in the peripheral portion is prevented from becoming excessively weak. Thus, by preventing the lens on the magnification side in the first optical system G1 from increasing in diameter, it is possible to achieve reduction in costs.

$$0.3<[Xr(yr)-Xk(yk)]/|f|<1 \qquad (4-1)$$

Figure 3:
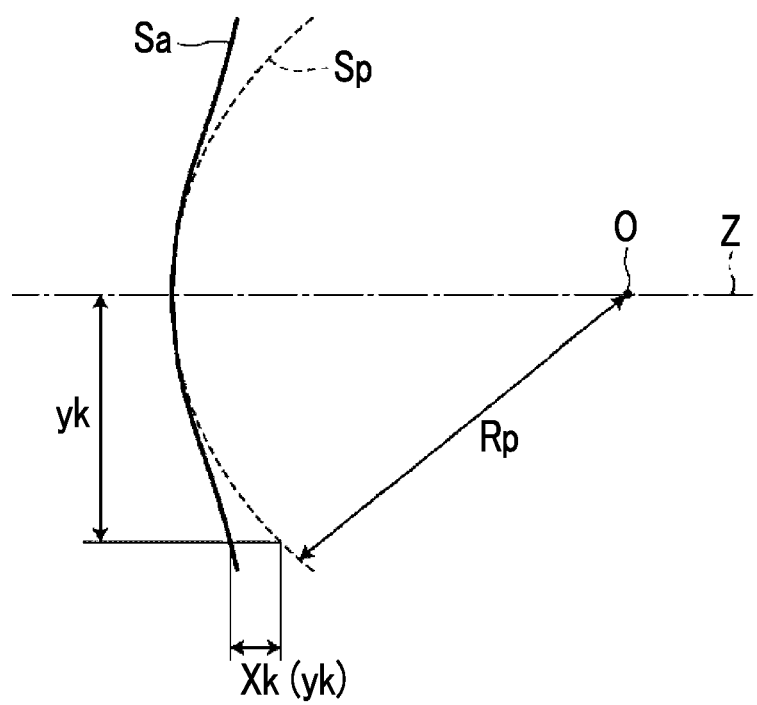
FIG. 3 is a conceptual diagram for explaining Xk(yk).
Figure 4:
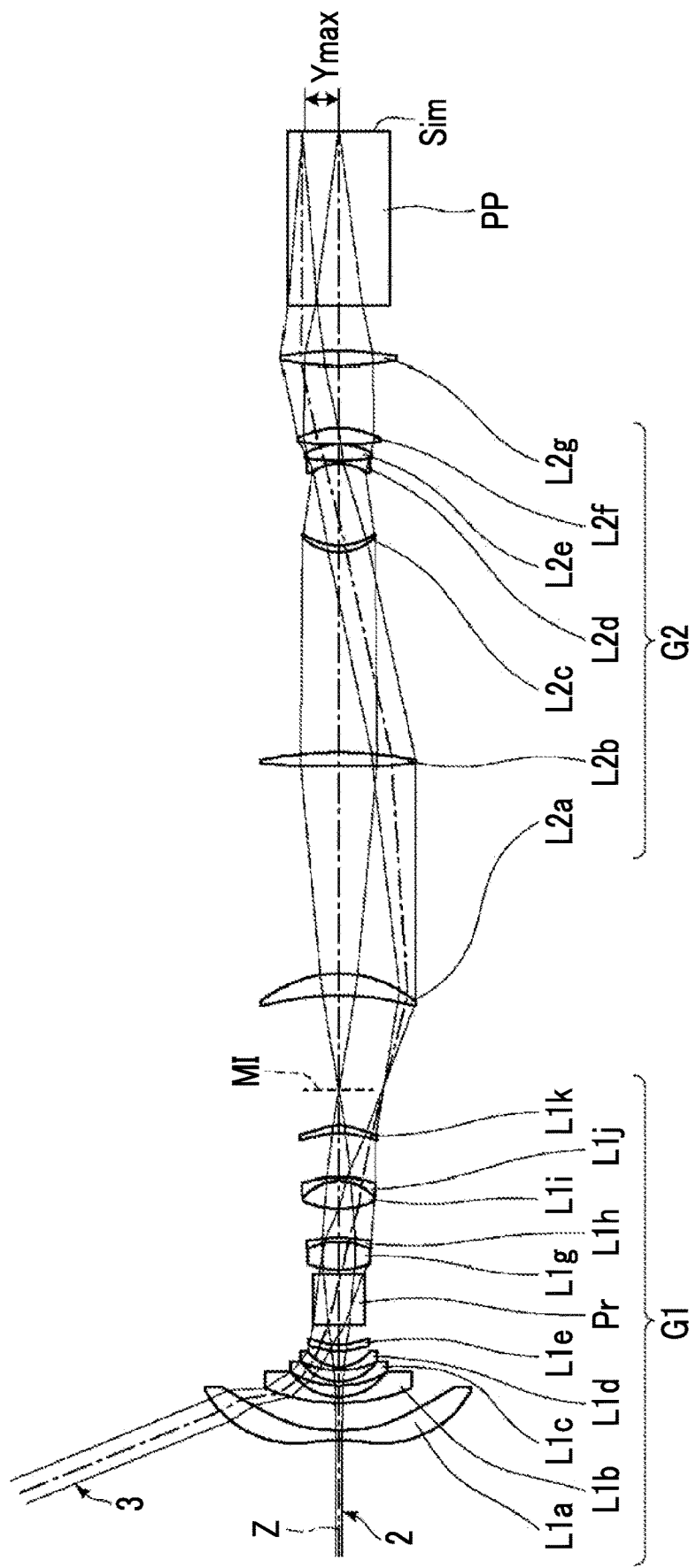
FIG. 4 is a cross-sectional view illustrating a configuration and rays of an imaging optical system according to Example 2 of the present invention.
Figure 5:
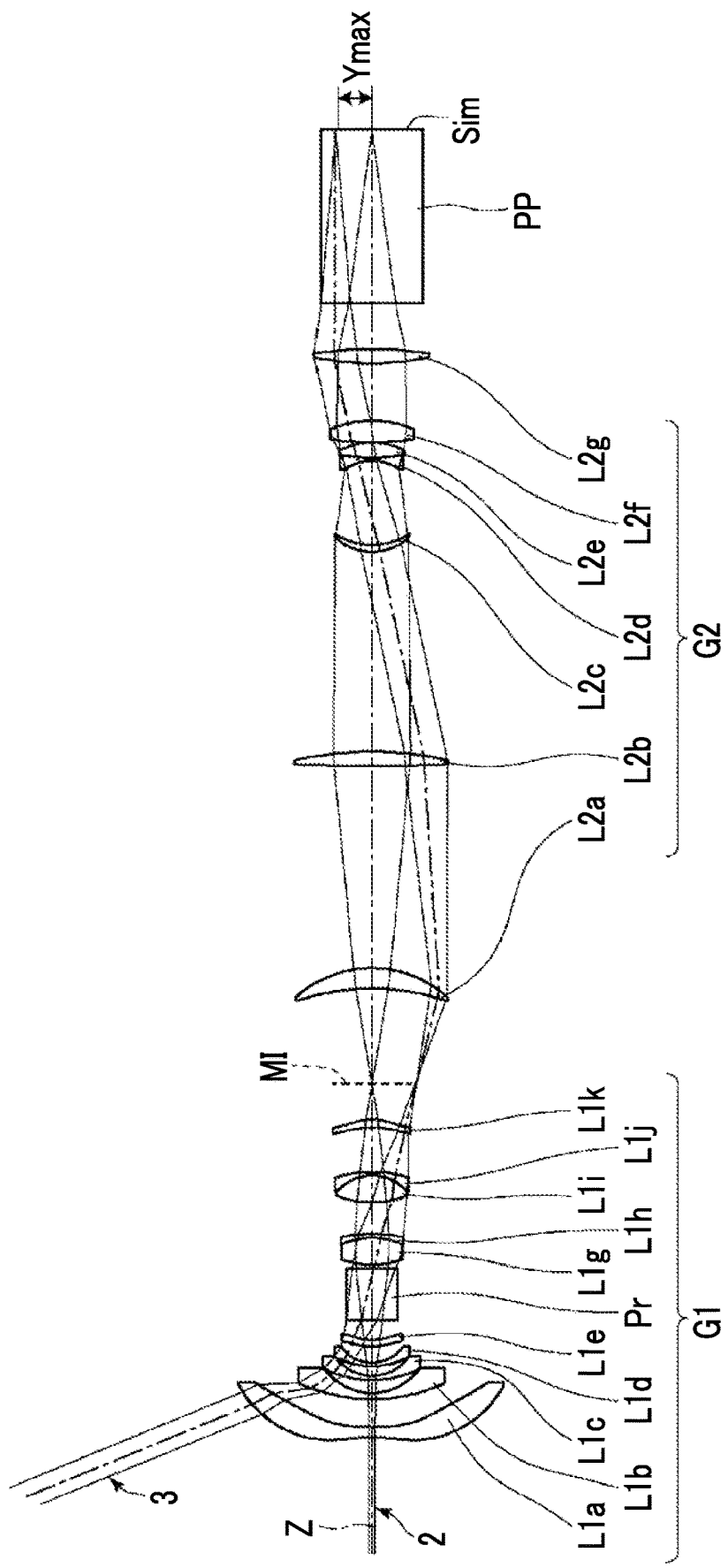
FIG. 5 is a cross-sectional view illustrating a configuration and rays of an imaging optical system according to Example 3 of the present invention.

Further, in order to facilitate understanding, FIG. 3 shows a conceptual diagram for explaining Xk(yk) in a case where the magnification side surface is aspheric. FIG. 3 shows, as an example of Xk(yk), an amount of deviation between the magnification side surface Sa of the aspheric lens and the paraxial spherical surface Sp of the surface Sa in the direction of the optical axis at the height yk. Here, the paraxial spherical surface Sp of the surface Sa is a spherical surface that passes through the intersection point between the surface Sa and the optical axis Z in a case where the paraxial radius of curvature Rp of the surface Sa is set as a radius. FIG. 3 also shows the center O of the paraxial spherical surface Sp. FIG. 3 shows a case where the magnification side surface is a convex surface, but it can be considered similarly in a case of a concave surface. In addition, it can be considered similarly about Xr(yr) of the reduction side surface.

Further, in the imaging optical system, assuming that a maximum image height on the reduction side imaging surface is Ymax and a height of the principal ray with the maximum angle of view on a lens surface closest to the reduction side in the first optical system G1 is hrc1, it is preferable to satisfy Conditional Expression (5). By not allowing the result of Conditional Expression (5) to be equal to or less than the lower limit, the lens diameter of the first optical system G1 is prevented from becoming large. Thus, it is possible to achieve reduction in costs. By not allowing the result of Conditional Expression (5) to be equal to or greater than the upper limit, spherical aberration, it becomes easy to correct field curvature and astigmatism.

$$0.8<Y\max/hrc1<1.5 \qquad (5)$$

Further, the imaging optical system is not limited to a configuration having a linear optical path as shown in FIG. 1. The imaging optical system may have a deflected optical path by disposing an optical path deflection member such as a mirror and/or a prism in the optical path thereof.

The above-mentioned preferred configurations and available configurations may be optional combinations, and it is preferable to selectively adopt the configurations in accordance with required specification. According to the present embodiment, in an optical system that forms an intermediate image, it is possible to provide an imaging optical system that has a wide angle of view and has excellent optical performance by minimizing the lens outer diameter and achieving reduction in costs as an optical system that forms an intermediate image. Further, the term "wide angle of view" described herein means that the total angle of view is greater than 130 degrees.

Next, numerical examples of the imaging optical system of the present invention will be described. The numerical data pieces of the following examples are all normalized such that the absolute value of the focal length of the whole system is 1.00, and are rounded up to a predetermined number of decimal places.

Example 1

A lens configuration and rays of an imaging optical system of Example 1 are shown in FIG. 1, and a configuration and an illustration method thereof is as described above. Therefore, repeated descriptions are partially omitted herein. The imaging optical system of Example 1 consists of, in order from the magnification side to the reduction side, a first optical system G1, and a second optical system G2. The first optical system G1 consists of, in order from the magnification side to the reduction side, lenses L1a to L1f, an optical member Pr, and lenses L1h to L1m. The second optical system G2 consists of, in order from the magnification side to the reduction side, lenses L2a to L2i. It should be noted that the optical member Pr is a member such as a prism whose incident surface and exit surface are parallel, which is similar to the optical member Pr in the Examples 2 and 3 described later.

Table 1 shows basic lens data of the imaging optical system of Example 1, Table 2 shows specification, and Table 3 shows aspheric surface coefficients thereof. In Table 1, the column of the surface number shows surface numbers. The surface closest to the magnification side is the first surface, and the surface numbers increase one by one toward the reduction side. The column of R shows radii of curvature of the respective surfaces. The column of D shows surface distances on the optical axis between the respective surfaces and the surfaces adjacent to the reduction side. Further, the column of Nd shows refractive indexes of the respective components at the d line (a wavelength of 587.6 nm (nanometers)), and the column of vd shows Abbe numbers of the respective components at the d line. Here, reference signs of radii of curvature of surface shapes convex toward the magnification side are set to be positive, and reference signs of radii of curvature of surface shapes convex toward the reduction side are set to be negative. Table 1 additionally shows the optical member PP.

Table 2 shows, as specification of the imaging optical system, respective values of the absolute value |f| of the focal length, the back focal length Bf at the air conversion distance in a case where the reduction side is set as a back side, F number FNo, and the maximum total angle of view 2ω, on the basis of the d line. [°] in the place of 2ω indicates that the unit thereof is a degree.

In Table 1, the reference sign * is attached to surface numbers of aspheric surfaces, and numerical values of the paraxial radius of curvature are written into the column of the radius of curvature of the aspheric surface. Table 3 shows surface numbers of the aspheric surfaces, and aspheric surface coefficients of the respective aspheric surfaces. The "E±n" (n: an integer) in numerical values of the aspheric surface coefficients of Table 3 indicates "×10$^{\pm n}$". The aspheric surface coefficients are values of the coefficients KA and Am (m=3, 4, 5, . . . or m=4, 6, 8, . . . ) in aspheric surface expression represented as the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, KA and Am are aspheric surface coefficients, and Σ in the aspheric surface expression means the sum with respect to m.

TABLE 1

| Example 1 | | | | |
|---|---|---|---|---|
| Surface Number | R | D | Nd | νd |
| *1 | −10.9769 | 0.6691 | 1.53158 | 55.08 |
| *2 | 15.4555 | 1.3989 | | |
| 3 | 11.7067 | 0.4959 | 1.58913 | 61.13 |
| 4 | 5.2679 | 1.0785 | | |
| 5 | 8.1056 | 0.3488 | 1.89190 | 37.13 |
| 6 | 3.9314 | 1.4795 | | |
| 7 | 29.9862 | 0.2726 | 1.72916 | 54.68 |

TABLE 1-continued

| Example 1 | | | | |
|---|---|---|---|---|
| Surface Number | R | D | Nd | νd |
| 8 | 3.2426 | 0.7130 | | |
| 9 | 3.6171 | 0.3932 | 1.80610 | 40.93 |
| 10 | 4.3293 | 0.0700 | | |
| *11 | 4.7549 | 0.2676 | 1.58313 | 59.37 |
| *12 | 3.5452 | 1.3453 | | |
| 13 | ∞ | 4.0143 | 1.51680 | 64.20 |
| 14 | ∞ | 0.9367 | | |
| 15 | 7.0465 | 1.6057 | 1.59270 | 35.31 |
| 16 | −443.5068 | 0.6654 | | |
| 17 | 10.5833 | 2.4724 | 1.49700 | 81.54 |
| 18 | −3.8937 | 0.0040 | | |
| 19 | −3.9313 | 0.2169 | 1.72047 | 34.71 |
| 20 | −7.1186 | 1.2603 | | |
| 21 | 6.7412 | 2.1094 | 1.49700 | 81.54 |
| 22 | −4.3366 | 0.2309 | 1.84666 | 23.78 |
| 23 | −15.2333 | 3.6430 | | |
| *24 | −5.9692 | 0.6691 | 1.58573 | 59.70 |
| *25 | −3.2492 | 9.2510 | | |
| 26 | −16.6644 | 1.3956 | 1.80610 | 40.93 |
| 27 | −8.1470 | 13.8338 | | |
| 28 | 25.9261 | 0.4271 | 1.71700 | 47.93 |
| 29 | 20.4960 | 1.4760 | | |
| 30 | 6491.1739 | 1.1655 | 1.56883 | 56.04 |
| 31 | −15.5033 | 11.8249 | | |
| 32 | 8.0376 | 0.9065 | 1.59522 | 67.73 |
| 33 | 64.3351 | 4.8015 | | |
| 34 | 9.1564 | 0.1781 | 1.56732 | 42.82 |
| 35 | 3.9216 | 2.5254 | | |
| 36 | −3.4904 | 0.1915 | 1.85478 | 24.80 |
| 37 | 15.9643 | 0.0041 | | |
| 38 | 16.3770 | 0.8955 | 1.49700 | 81.54 |
| 39 | −5.0220 | 0.0039 | | |
| 40 | 55.2215 | 1.7472 | 1.49700 | 81.54 |
| 41 | −4.8826 | 3.3856 | | |
| 42 | 27.0478 | 0.9444 | 1.92286 | 20.88 |
| 43 | −18.7175 | 3.0777 | | |
| 44 | ∞ | 11.7754 | 1.51633 | 64.14 |
| 45 | ∞ | | | |

TABLE 2

| Example 1 | |
|---|---|
| |f| | 1.00 |
| Bf | 10.84 |
| FNo. | 2.52 |
| 2ω[°] | 136.2 |

TABLE 3

| Example 1 | | | | |
|---|---|---|---|---|
| Surface Number | 1 | 2 | 24 | 25 |
| KA | −1.50000000E+01 | −7.54836178E−02 | −1.49999980E+01 | −2.59178583E+00 |
| A3 | 7.80565731E−03 | 1.96365534E−02 | −4.41653919E−03 | −8.68217255E−03 |
| A4 | 1.98877138E−03 | −2.05633050E−02 | 6.70548127E−03 | 1.72160128E−02 |
| A5 | −7.10431147E−04 | 2.15570486E−02 | −2.85767852E−03 | −3.31646220E−03 |
| A6 | 6.00756069E−05 | −1.54383962E−02 | −9.50701994E−05 | −1.07846865E−03 |
| A7 | 7.11298668E−06 | 7.64509316E−03 | 3.47594047E−05 | 7.05162400E−04 |
| A8 | −1.53259138E−06 | −2.69291901E−03 | 4.85004926E−06 | −2.01532053E−04 |
| A9 | 1.00469312E−08 | 6.87572818E−04 | 2.98557925E−06 | 5.96694256E−05 |
| A10 | 1.67665173E−08 | −1.28696119E−04 | −5.16371652E−07 | −9.65655992E−06 |
| A11 | −1.09049559E−09 | 1.76771431E−05 | −3.60149713E−07 | 1.58278701E−07 |
| A12 | −5.72147771E−11 | −1.76132942E−06 | 1.24344220E−07 | −5.74681109E−09 |
| A13 | 9.30758233E−12 | 1.23807783E−07 | 2.77688827E−08 | 8.22157837E−08 |
| A14 | −1.92865588E−13 | −5.81694159E−09 | 2.11874068E−10 | −1.99057331E−08 |
| A15 | −3.42026736E−14 | 1.63835343E−10 | −1.13748773E−10 | 1.86576428E−09 |
| A16 | 2.25968239E−15 | −2.09037047E−12 | 6.52711664E−10 | −1.14845188E−10 |

TABLE 3-continued

| | Example 1 | |
|---|---|---|
| Surface Number | 11 | 12 |
| KA | 1.00000000E+00 | 1.00000000E+00 |
| A4 | −2.94534426E−03 | 2.92683074E−03 |
| A6 | 6.68498838E−04 | 2.84021543E−04 |
| A8 | −3.06461230E−05 | 3.19906389E−05 |
| A10 | 2.32888251E−06 | −9.73315724E−07 |

Figure 6:
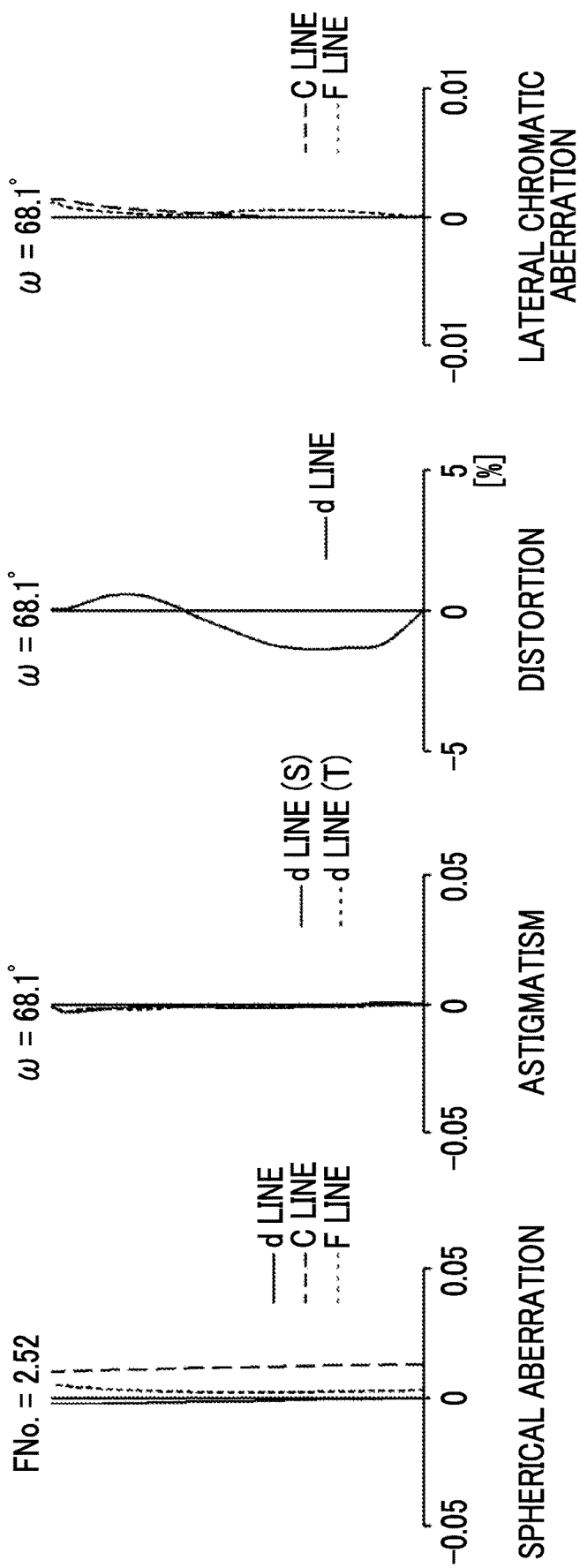
FIG. 6 is a diagram of aberrations of the imaging optical system of Example 1 of the present invention.

FIG. 6 shows aberration diagrams of spherical aberration, astigmatism, distortion, and lateral chromatic aberration of the imaging optical system of Example 1 in order from the left side. In the spherical aberration diagram, aberrations at the d line (a wavelength of 587.6 nm), the C line (a wavelength of 656.3 nm), and the F line (a wavelength of 486.1 nm) are respectively indicated by the solid line, the long dashed line, and the short dashed line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line and the F line are respectively indicated by the long dashed line and the short dashed line. In the spherical aberration diagram, FNo. indicates an F number. In the other aberration diagrams, ω indicates a half angle of view. The diagrams shown in FIG. 6 are diagrams in a case where the distance on the optical axis from the lens surface closest to the magnification side to the magnification side imaging surface is 201.

Symbols, meanings, description methods, and illustration methods of the respective data pieces according to Example 1 are the same as those in the following examples unless otherwise noted. Therefore, in the following description, repeated description will be omitted.

Example 2

FIG. 2 is a cross-sectional view of a lens configuration and rays of an imaging optical system of Example 2. The imaging optical system of Example 2 consists of, in order from the magnification side to the reduction side, a first optical system G1, and a second optical system G2. The first optical system G1 consists of, in order from the magnification side to the reduction side, lenses L1a to L1e, an optical member Pr, and lenses L1g to L1k. The second optical system G2 consists of, in order from the magnification side to the reduction side, lenses L2a to L2g.

Figure 7:
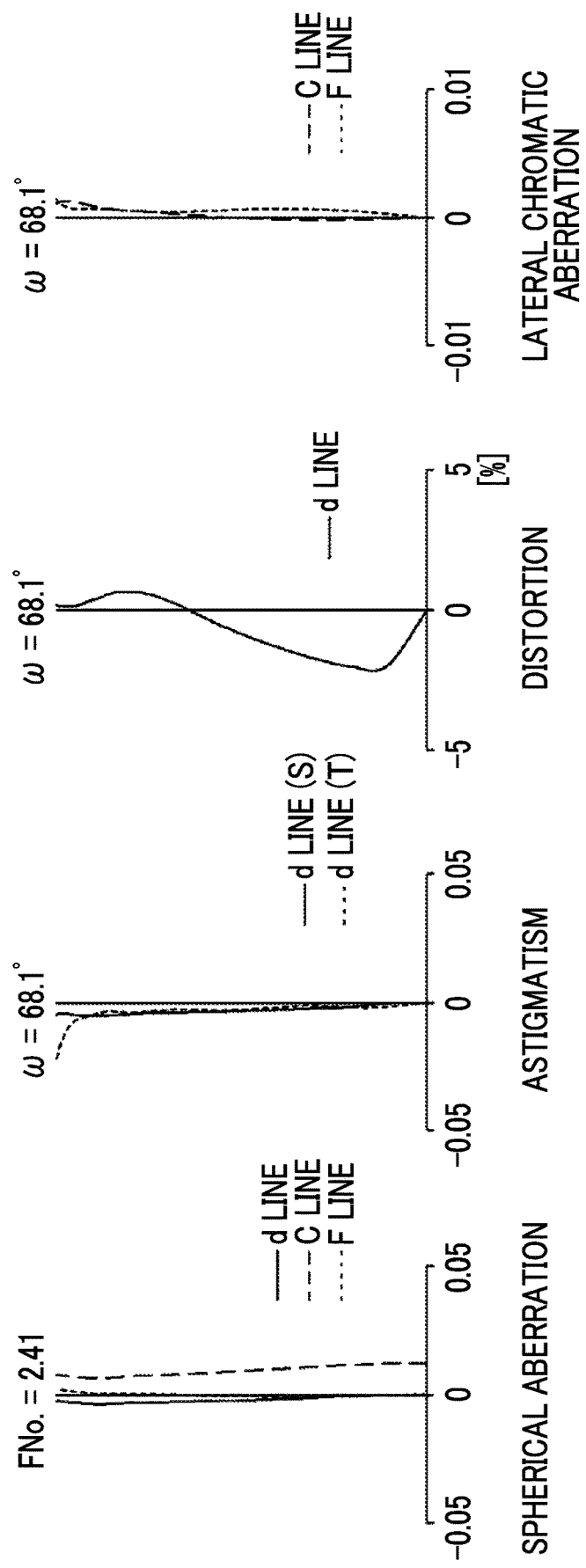
FIG. 7 is a diagram of aberrations of the imaging optical system of Example 2 of the present invention.

Table 4 shows basic lens data of the imaging optical system of Example 2, Table 5 shows specification, Table 6 shows aspheric surface coefficients, and FIG. 7 shows aberration diagrams. The diagrams shown in FIG. 7 are diagrams in a case where the distance on the optical axis from the lens surface closest to the magnification side to the magnification side imaging surface is 201.

TABLE 4

| | Example 2 | | | |
|---|---|---|---|---|
| Surface Number | R | D | Nd | νd |
| *1 | −6.0172 | 0.6705 | 1.53158 | 55.08 |
| *2 | 686.8633 | 1.8474 | | |
| 3 | 13.1134 | 0.4124 | 1.58913 | 61.13 |

TABLE 4-continued

| | Example 2 | | | |
|---|---|---|---|---|
| Surface Number | R | D | Nd | νd |
| 4 | 4.0678 | 0.7622 | | |
| 5 | 6.4589 | 0.2849 | 1.89190 | 37.13 |
| 6 | 3.2021 | 0.7470 | | |
| 7 | 6.2815 | 0.2319 | 1.71299 | 53.87 |
| 8 | 2.6602 | 1.0792 | | |
| *9 | 3.6210 | 0.4134 | 1.58573 | 59.70 |
| *10 | 3.3516 | 1.3409 | | |
| 11 | ∞ | 3.4865 | 1.56883 | 56.04 |
| 12 | ∞ | 0.2682 | | |
| 13 | 6.3502 | 1.8775 | 1.77250 | 49.60 |
| 14 | −5.2028 | 0.2682 | 1.75520 | 27.51 |
| 15 | −12.2145 | 1.9707 | | |
| 16 | 6.2471 | 1.8785 | 1.49700 | 81.54 |
| 17 | −3.2490 | 0.2252 | 1.84666 | 23.78 |
| 18 | −8.7987 | 2.9636 | | |
| *19 | −4.4943 | 0.5464 | 1.69350 | 53.18 |
| *20 | −2.6819 | 8.7512 | | |
| 21 | −20.0883 | 1.5047 | 1.77250 | 49.60 |
| 22 | −8.3163 | 14.0409 | | |
| 23 | 77.3820 | 0.9450 | 1.80610 | 33.27 |
| 24 | −27.3492 | 13.6714 | | |
| 25 | 3.5893 | 0.4631 | 1.51742 | 52.43 |
| 26 | 4.3937 | 5.5025 | | |
| 27 | −3.3121 | 0.2084 | 1.85478 | 24.80 |
| 28 | 15.2642 | 0.0259 | | |
| 29 | 17.7844 | 1.0871 | 1.49700 | 81.54 |
| 30 | −4.6622 | 0.0041 | | |
| 31 | 23.3221 | 1.0720 | 1.49700 | 81.54 |
| 32 | −6.4843 | 4.2135 | | |
| 33 | 20.8547 | 0.9882 | 1.89286 | 20.36 |
| 34 | −22.7102 | 3.0842 | | |
| 35 | ∞ | 11.8003 | 1.51633 | 64.14 |
| 36 | ∞ | | | |

TABLE 5

| Example 2 | |
|---|---|
| \|f\| | 1.00 |
| Bf | 10.86 |
| FNo. | 2.41 |
| 2ω[°] | 136.2 |

TABLE 6

Example 2

| Surface Number | 1 | 2 | 19 | 20 |
|---|---|---|---|---|
| KA | −1.25428976E+01 | −1.50000000E+01 | −1.50000000E+01 | −2.55145419E+00 |
| A3 | 1.05602474E−02 | 3.04503443E−02 | −3.52510142E−02 | −4.14012658E−02 |
| A4 | 9.55579651E−04 | −3.50906663E−02 | 7.65700909E−02 | 9.40935863E−02 |
| A5 | −6.43015389E−04 | 4.43153844E−02 | −6.31865404E−02 | −7.44058991E−02 |
| A6 | 1.13109956E−04 | −3.71259683E−02 | −2.31274643E−02 | 1.19536391E−02 |
| A7 | −3.81445147E−06 | 2.12951279E−02 | 4.10452869E−02 | 2.59993151E−02 |
| A8 | −2.38351866E−06 | −8.67078005E−03 | −2.07417323E−02 | −1.61586348E−02 |
| A9 | 3.94327461E−07 | 2.56052257E−03 | −6.15424948E−03 | −7.53793923E−04 |
| A10 | 1.24079221E−08 | −5.54620706E−04 | 7.88178459E−03 | 3.20069179E−03 |
| A11 | −7.66002252E−09 | 8.81650304E−05 | −1.04346450E−03 | −5.83915090E−04 |
| A12 | 2.73119271E−10 | −1.01650935E−05 | −9.66846622E−04 | −2.32214096E−04 |
| A13 | 6.44673173E−11 | 8.26667339E−07 | 3.28020248E−04 | 8.04705642E−05 |
| A14 | −4.20770176E−12 | −4.49279807E−08 | 1.81934662E−05 | 7.45405338E−07 |
| A15 | −2.08850073E−13 | 1.46352360E−09 | −2.13183148E−05 | −2.35948314E−06 |
| A16 | 1.75846736E−14 | −2.15981067E−11 | 2.51851322E−06 | 1.67477386E−07 |

| Surface Number | 9 | 10 |
|---|---|---|
| KA | 1.00000000E+00 | 1.00000000E+00 |
| A4 | −2.09021875E−02 | −1.87380139E−02 |
| A6 | 3.65640647E−04 | 2.36757605E−04 |
| A8 | 3.90485521E−04 | 5.06488383E−04 |
| A10 | −3.64051472E−05 | −6.36910953E−05 |

Example 3

FIG. 3 is a cross-sectional view of a lens configuration and rays of an imaging optical system of Example 3. The imaging optical system of Example 3 consists of, in order from the magnification side to the reduction side, a first optical system G1, and a second optical system G2. The first optical system G1 consists of, in order from the magnification side to the reduction side, lenses L1a to L1e, an optical member Pr, and lenses L1g to L1k. The second optical system G2 consists of, in order from the magnification side to the reduction side, lenses L2a to L2g.

Figure 8:
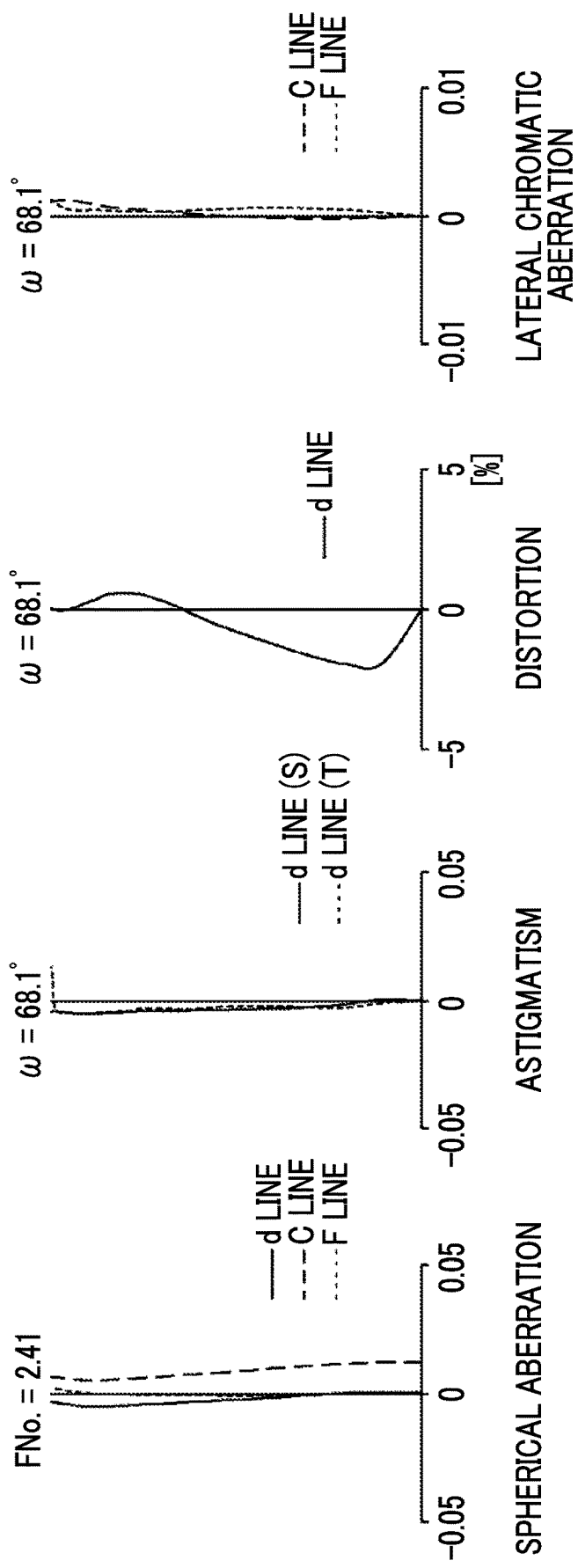
FIG. 8 is a diagram of aberrations of the imaging optical system of Example 3 of the present invention.

Table 7 shows basic lens data of the imaging optical system of Example 3, Table 8 shows specification, Table 9 shows aspheric surface coefficients, and FIG. 8 shows aberration diagrams. The diagrams shown in FIG. 8 are diagrams in a case where the distance on the optical axis from the lens surface closest to the magnification side to the magnification side imaging surface is 201.

TABLE 7

Example 3

| Surface Number | R | D | Nd | νd |
|---|---|---|---|---|
| *1 | −6.1529 | 0.6704 | 1.53158 | 55.08 |
| *2 | 202.6841 | 1.9082 | | |
| 3 | 12.1688 | 0.4125 | 1.58913 | 61.13 |
| 4 | 4.1181 | 0.8886 | | |
| 5 | 7.6004 | 0.2890 | 1.89190 | 37.13 |
| 6 | 3.1818 | 0.6434 | | |
| 7 | 5.4480 | 0.2309 | 1.71299 | 53.87 |
| 8 | 2.6068 | 1.1065 | | |
| *9 | 3.5711 | 0.4393 | 1.58573 | 59.70 |
| *10 | 3.3074 | 1.3408 | | |
| 11 | ∞ | 3.4860 | 1.56883 | 56.04 |
| 12 | ∞ | 0.2682 | | |
| 13 | 6.7031 | 1.8088 | 1.77250 | 49.60 |
| 14 | −5.0720 | 0.2682 | 1.75520 | 27.51 |
| 15 | −10.8641 | 2.1110 | | |
| 16 | 6.5098 | 1.8446 | 1.49700 | 81.54 |
| 17 | −3.2822 | 0.2384 | 1.84666 | 23.78 |
| 18 | −8.7186 | 3.0230 | | |
| *19 | −5.0235 | 0.5702 | 1.69350 | 53.18 |

TABLE 7-continued

Example 3

| Surface Number | R | D | Nd | νd |
|---|---|---|---|---|
| *20 | −2.9243 | 8.8304 | | |
| 21 | −16.4234 | 1.3992 | 1.77250 | 49.60 |
| 22 | −7.8528 | 13.6196 | | |
| 23 | 141.8523 | 0.9549 | 1.80610 | 33.27 |
| 24 | −23.9609 | 13.6374 | | |
| 25 | 3.7454 | 0.4792 | 1.51742 | 52.43 |
| 26 | 4.7184 | 5.6704 | | |
| 27 | −3.4646 | 0.2025 | 1.85478 | 24.80 |
| 28 | 13.3888 | 0.0205 | | |
| 29 | 14.8370 | 1.0369 | 1.49700 | 81.54 |
| 30 | −4.7243 | 0.0054 | | |
| 31 | 20.1826 | 1.4799 | 1.49700 | 81.54 |
| 32 | −7.1576 | 3.8801 | | |
| 33 | 19.1501 | 0.9792 | 1.89286 | 20.36 |
| 34 | −25.5787 | 3.0838 | | |
| 35 | ∞ | 11.7989 | 1.51633 | 64.14 |
| 36 | ∞ | | | |

TABLE 8

Example 3

| | |
|---|---|
| \|f\| | 1.00 |
| Bf | 10.86 |
| FNo. | 2.41 |
| 2ω[°] | 136.2 |

TABLE 9

Example 3

| Surface Number | 1 | 2 | 19 | 20 |
|---|---|---|---|---|
| KA | −1.17295674E+01 | −7.44142312E−08 | −1.49483756E+01 | −2.77603303E+00 |
| A3 | 1.42973136E−02 | 3.47410432E−02 | −2.91220559E−02 | −3.45925783E−02 |
| A4 | −3.48133676E−04 | −3.80851717E−02 | 7.07648070E−02 | 7.89817388E−02 |
| A5 | −6.81716848E−04 | 4.58510213E−02 | −6.04411405E−02 | −5.42642498E−02 |
| A6 | 2.14592422E−04 | −3.83860900E−02 | 2.31051346E−02 | −9.98905041E−04 |
| A7 | −1.59249717E−05 | 2.22255272E−02 | 3.35055933E−02 | 2.45535392E−02 |
| A8 | −5.02760770E−06 | −9.12498681E−03 | −1.87191800E−02 | −9.22986563E−03 |
| A9 | 9.77912533E−07 | 2.71211505E−03 | −3.68058266E−03 | −3.81079068E−03 |
| A10 | 3.34914085E−08 | −5.90895995E−04 | 6.08298549E−03 | 2.63722174E−03 |
| A11 | −1.92985707E−08 | 9.44996338E−05 | −9.73321451E−04 | 1.94537355E−04 |
| A12 | 5.42960143E−10 | −1.09656157E−05 | −6.60937158E−04 | −3.48179138E−04 |
| A13 | 1.72678630E−10 | 8.97715740E−07 | 2.35493607E−04 | 2.17923204E−05 |
| A14 | −9.88585483E−12 | −4.91123449E−08 | 1.01171525E−05 | 1.90438830E−05 |
| A15 | −5.96322667E−13 | 1.60995958E−09 | −1.36041129E−05 | −2.23448605E−06 |
| A16 | 4.46673717E−14 | −2.38994418E−11 | 1.52978361E−06 | −1.89943764E−07 |

| Surface Number | 9 | 10 |
|---|---|---|
| KA | 1.00000000E+00 | 1.00000000E+00 |
| A4 | −2.08106640E−02 | −1.80527659E−02 |
| A6 | 2.35766310E−04 | −2.66597117E−05 |
| A8 | 3.86403850E−04 | 5.55469832E−04 |
| A10 | −2.95361976E−05 | −6.28445237E−05 |

Table 10 shows values corresponding to Conditional Expressions (1) to (5) of the imaging optical systems of Examples 1 to 3. In the imaging optical system of Examples 1 to 3, the d line is set as the reference wavelength, and the values shown in Table 10 are based on the d line.

TABLE 10

| Expression Number | | Example 1 | Example 2 | Example 3 |
|---|---|---|---|---|
| (1) | hkc2/hrc1 | 1.94 | 2.01 | 1.95 |
| (2) | hkm2/hs | 0.59 | 0.48 | 0.47 |
| (3) | θ | 17.47 | 18.71 | 18.15 |
| (4) | [Xr(yr) − Xk(yk)]/|f| | 0.467 | 0.722 | 0.639 |
| (5) | Ymax/hrc1 | 1.09 | 1.09 | 1.09 |

As can be seen from the above-mentioned data, each of the imaging optical systems of Examples 1 to 3 has a wide angle such that a total angle of view is equal to or greater than 135° and has a lens outer diameter minimized, whereby aberrations are satisfactorily corrected, and high optical performance is achieved.

Figure 9:
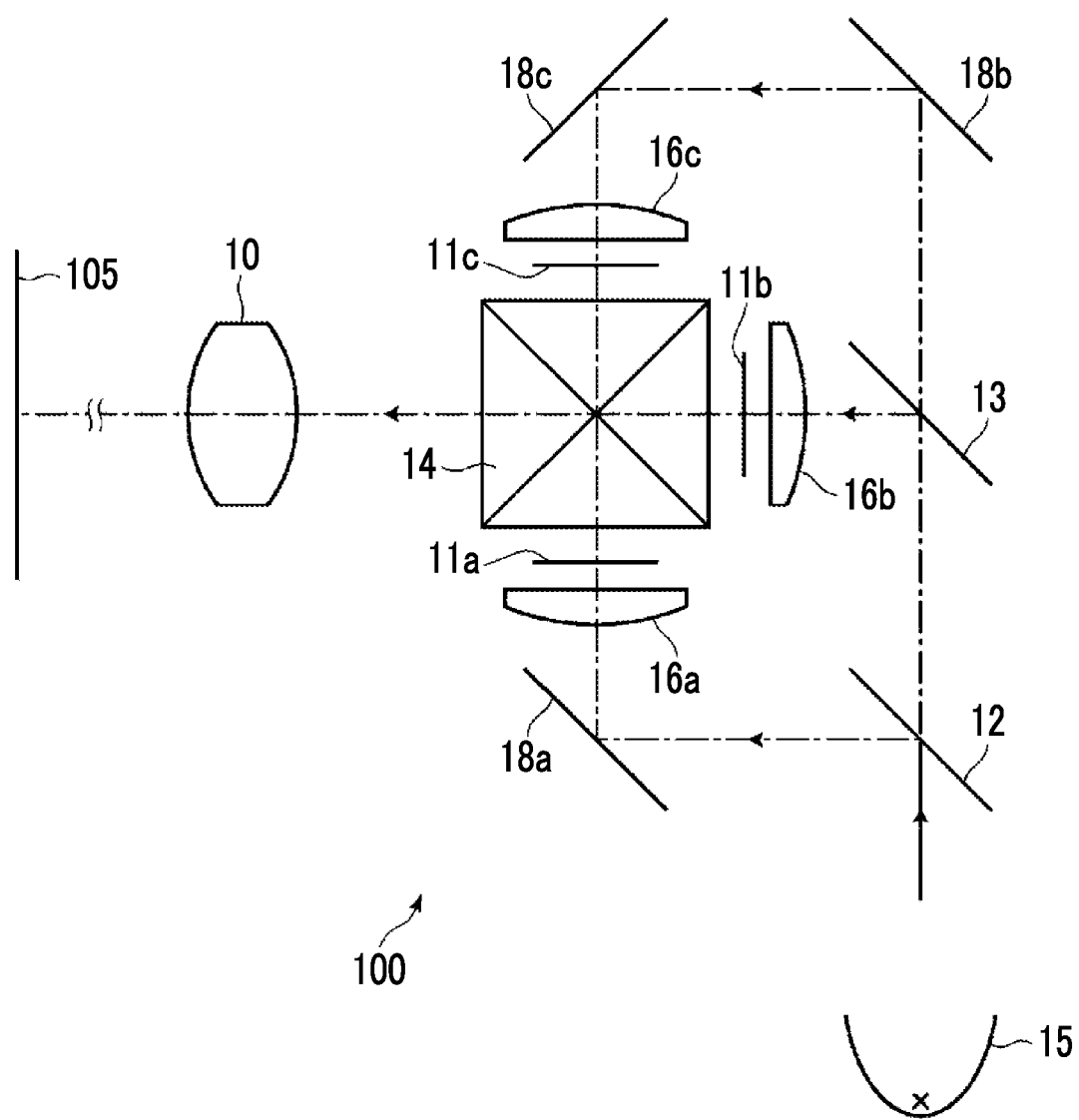
FIG. 9 is a schematic configuration diagram of a projection display device according to an embodiment of the present invention.

Next, a projection display device according to an embodiment of the present invention will be described. FIG. 9 is a schematic configuration diagram of the projection display device according to the above-mentioned embodiment of the present invention. The projection display device 100 shown in FIG. 9 has an imaging optical system 10 according to the above-mentioned embodiment of the present invention, a light source 15, transmissive display elements 11a to 11c as light valves corresponding to respective color light rays, dichroic mirrors 12 and 13 for color separation, a cross dichroic prism 14 for color synthesis, condenser lenses 16a to 16c, and total reflection mirrors 18a to 18c for deflecting the optical path. In FIG. 9, the imaging optical system 10 is schematically illustrated. Further, an integrator is disposed between the light source 15 and the dichroic mirror 12, but illustration thereof is omitted in FIG. 9.

White light originated from the light source 15 is separated into rays with three colors (green light, blue light, red light) through the dichroic mirrors 12 and 13. Thereafter, the rays respectively pass through the condenser lenses 16a to 16c, are incident into and modulated through the transmissive display elements 11a to 11c respectively corresponding to the rays with the respective colors, are subjected to color synthesis through the cross dichroic prism 14, and are subsequently incident into the imaging optical system 10. The imaging optical system 10 projects an optical image, which is formed by the modulated light modulated through the transmissive display elements 11a to 11c, onto a screen 105.

Figure 10:
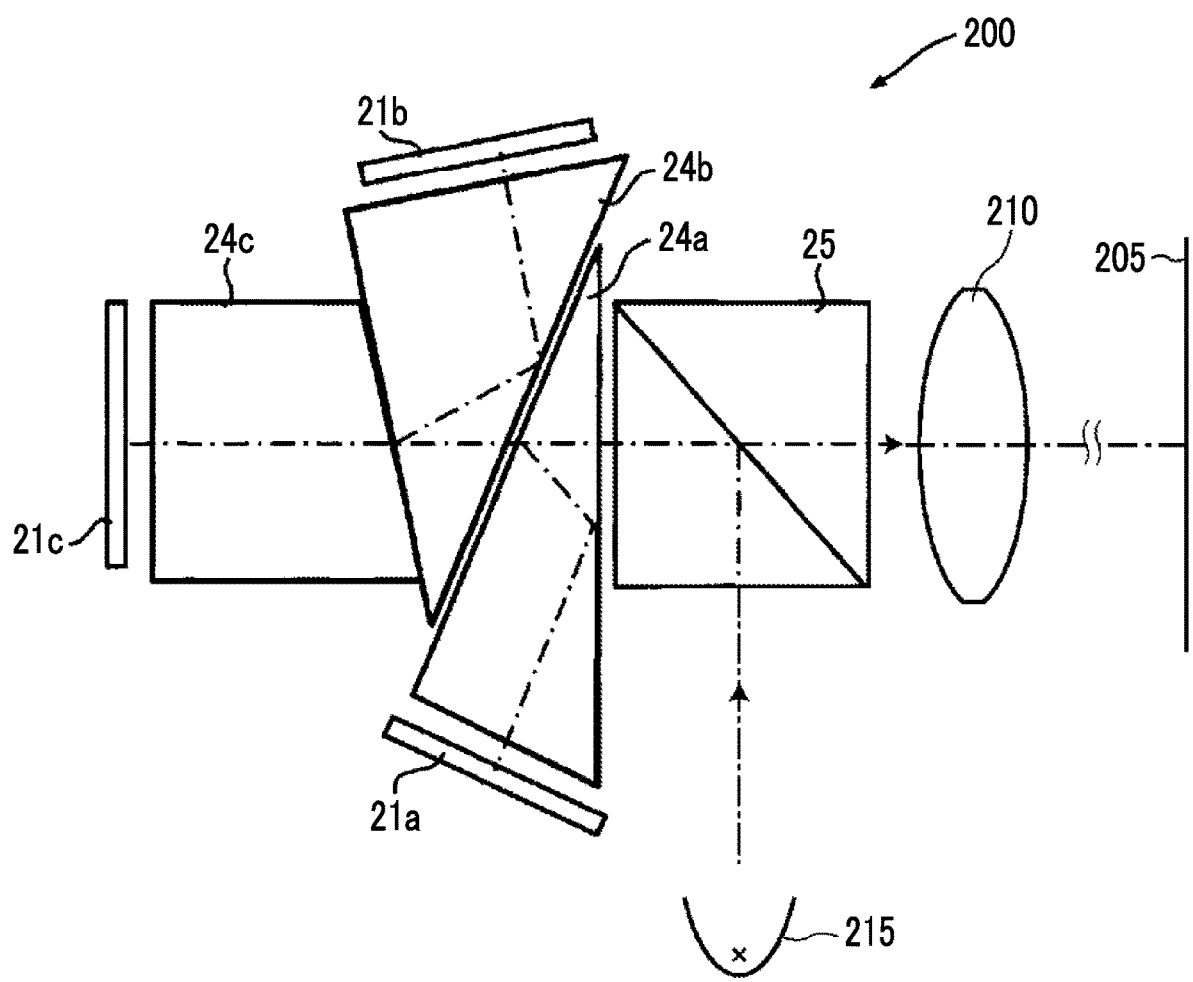
FIG. 10 is a schematic configuration diagram of a projection display device according to another embodiment of the present invention.

FIG. 10 is a schematic configuration diagram of a projection display device according to another embodiment of the present invention. The projection display device 200 shown in FIG. 10 has an imaging optical system 210 according to the above-mentioned embodiment of the present invention, a light source 215, DMD elements 21a to 21c as light valves corresponding to respective color light rays, total internal reflection (TIR) prisms 24a to 24c for color separation and color synthesis, and a polarization separating prism 25 that separates illumination light and projection light. In FIG. 10, the imaging optical system 210 is schematically illustrated. Further, an integrator is disposed between the light source 215 and the polarization separating prism 25, but illustration thereof is omitted in FIG. 10.

White light originated from the light source 215 is reflected on a reflective surface inside the polarization separating prism 25, and is separated into rays with three colors (green light, blue light, red light) through the TIR prisms 24a to 24c. The separated rays with the respective colors are respectively incident into and modulated through the corresponding DMD elements 21a to 21c, travel through the TIR prisms 24a to 24c again in a reverse direction, are subjected to color synthesis, are subsequently transmitted through the polarization separating prism 25, and are incident into the imaging optical system 210. The imaging optical system 210 projects an optical image, which is formed by the modulated light modulated through the DMD elements 21a to 21c, onto a screen 205.

Figure 11:
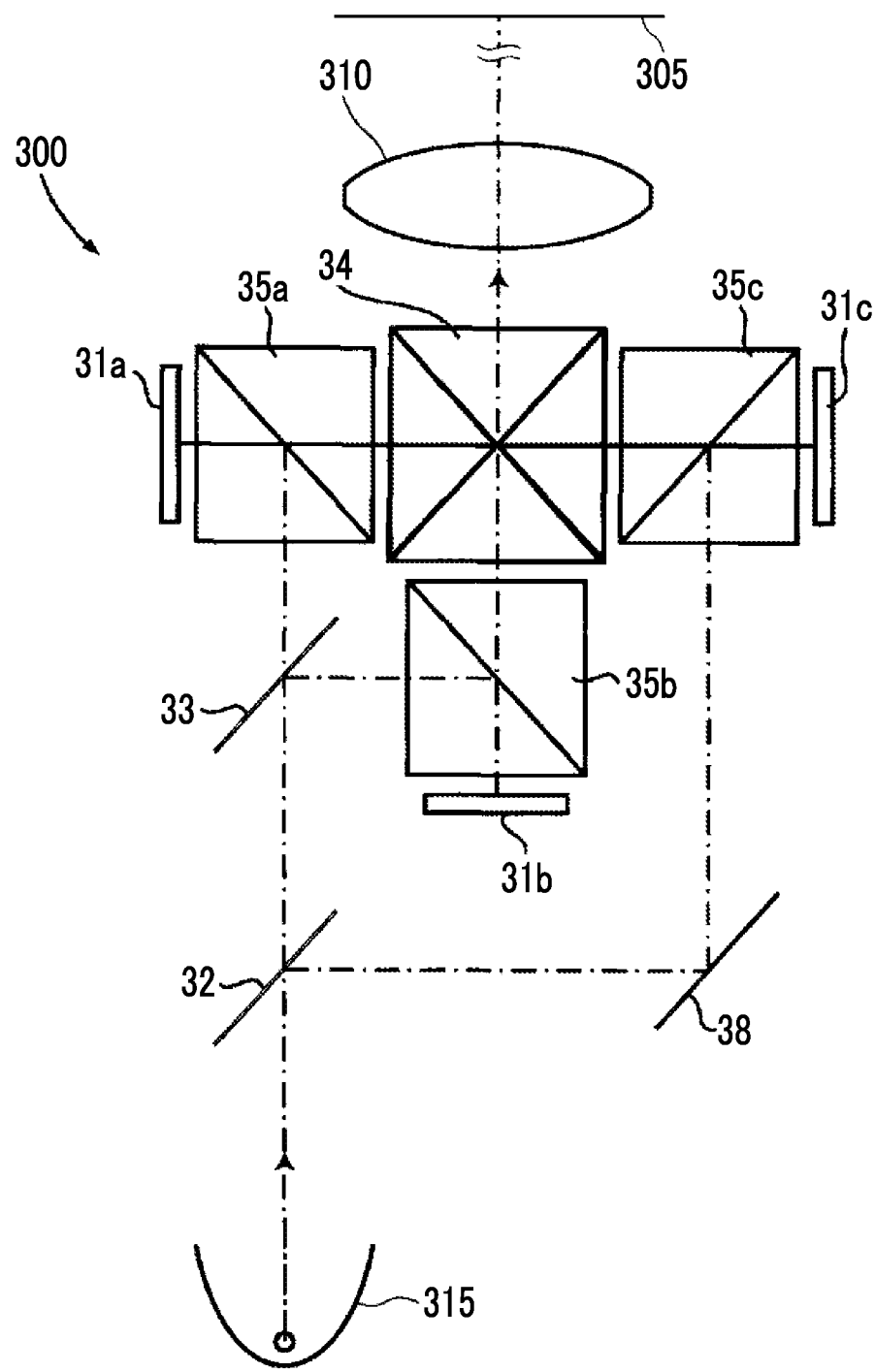
FIG. 11 is a schematic configuration diagram of a projection display device according to still another embodiment of the present invention.

FIG. 11 is a schematic configuration diagram of a projection display device according to still another embodiment of the present invention. The projection display device 300 shown in FIG. 11 has an imaging optical system 310 according to the above-mentioned embodiment of the present invention, a light source 315, reflective display elements 31a to 31c as light valves corresponding to respective color light rays, dichroic mirrors 32 and 33 for color separation, a cross dichroic prism 34 for color synthesis, a total reflection mirror 38 for deflecting the optical path, and polarization separating prisms 35a to 35c. In FIG. 11, the imaging optical system 310 is schematically illustrated. Further, an integrator is disposed between the light source 315 and the dichroic mirror 32, but illustration thereof is omitted in FIG. 11.

White light originated from the light source 315 is separated into rays with three colors (green light, blue light, red light) through the dichroic mirrors 32 and 33. The separated rays with the respective colors respectively pass through the polarization separating prisms 35a to 35c, are incident into and modulated through the reflective display elements 31a to 31c respectively corresponding to the rays with the respective colors, are subjected to color synthesis through the cross dichroic prism 34, and are subsequently incident into the imaging optical system 310. The imaging optical system 310 projects an optical image, which is formed by the modulated light modulated through the reflective display elements 31a to 31c, onto a screen 305.

Figure 12:
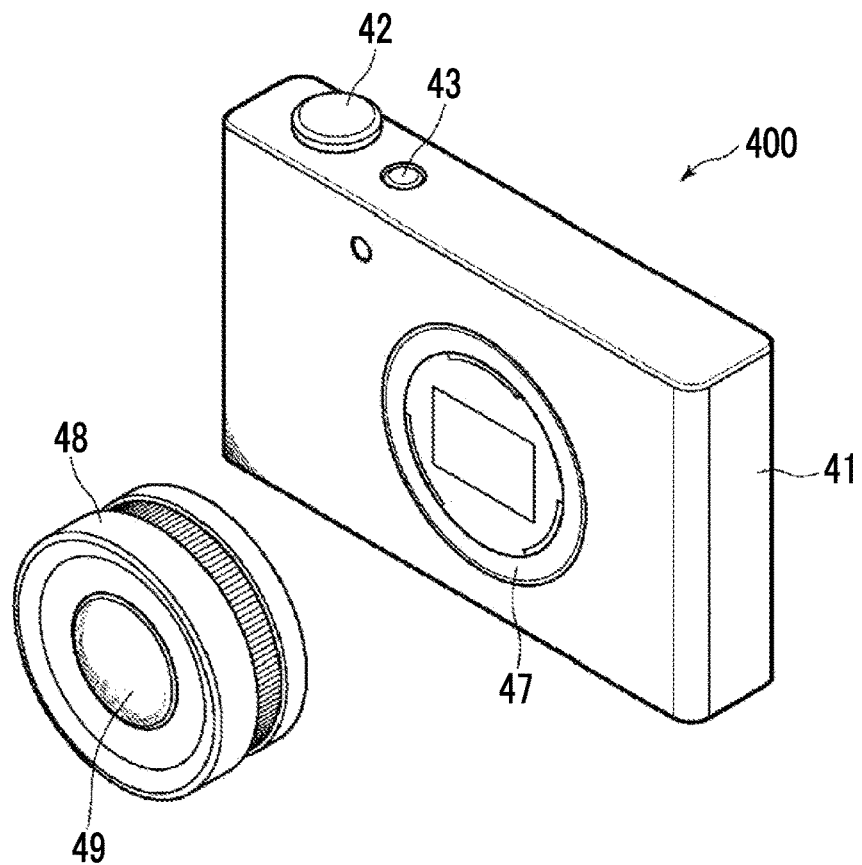
FIG. 12 is a perspective view of the front side of an imaging apparatus according to an embodiment of the present invention.
Figure 13:
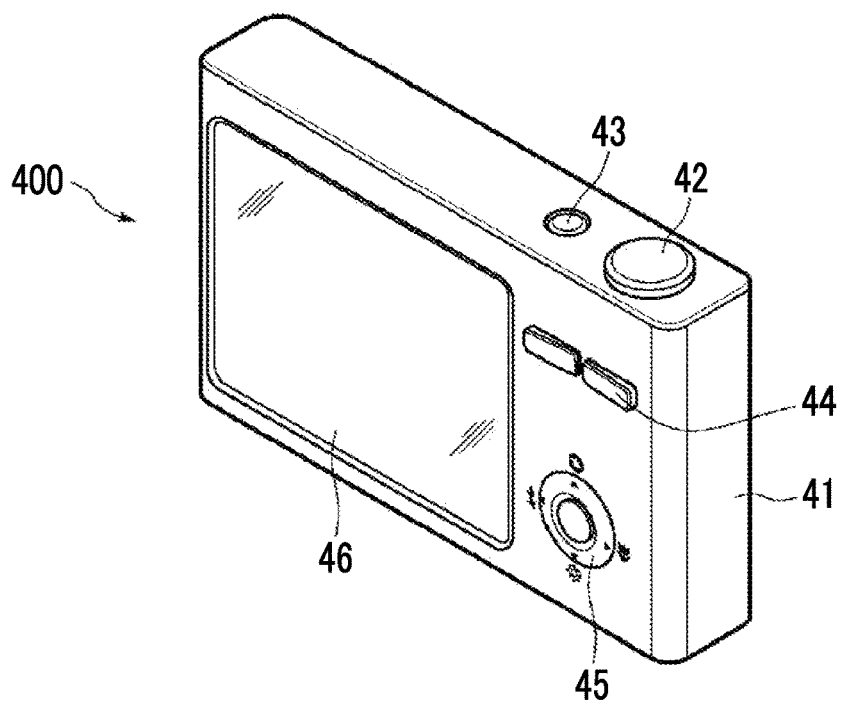
FIG. 13 is a perspective view of the rear side of the imaging apparatus shown in FIG. 12.

FIGS. 12 and 13 are external views of a camera 400 which is the imaging apparatus according to the above-mentioned embodiment of the present invention. FIG. 12 is a perspective view of the camera 400 viewed from the front side, and FIG. 13 is a perspective view of the camera 400 viewed from the rear side. The camera 400 is a single-lens digital camera on which an interchangeable lens 48 is detachably mounted and which has no reflex finder. The interchangeable lens 48 is configured such that an imaging optical system 49 as the optical system according to the above-mentioned embodiment of the present invention is housed in a lens barrel.

The camera 400 comprises a camera body 41, and a shutter button 42 and a power button 43 are provided on an upper surface of the camera body 41. Further, an operation section 44, an operation section 45, and a display section 46 are provided on a rear surface of the camera body 41. The display section 46 is for displaying a captured image and an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element (not shown in the drawing), a signal processing circuit (not shown in the drawing), a storage medium (not shown in the drawing), and the like. The imaging element such as a charge coupled device (CCD) or a complementary metal oxide semiconductor (CMOS) outputs a captured image signal based on a subject image which is formed through the interchangeable lens 48. The signal processing circuit generates an image through processing of the captured image signal which is output from the imaging element. The storage medium records the generated image. The camera 400 is able to capture a still image or a moving image by pressing the shutter button 42, and is able to store image data, which is obtained through imaging, in the storage medium.

The present invention has been hitherto described through embodiments and examples, but the present invention is not limited to the above-mentioned embodiments and examples, and may be modified into various forms. For example, values such as the radius of curvature, the surface spacing, the refractive index, the Abbe number, and the aspheric surface coefficient of each lens are not limited to the values shown in the numerical examples, and different values may be used therefor.

The projection display device of the present invention is also not limited to the above-mentioned configuration, and various modifications of the optical member and the light valve used for the ray separation or the ray synthesis, for example, can be made.

Further, the imaging apparatus of the present invention is not limited to the above configuration. For example, the present invention can also be applied to cameras other than the non-reflex cameras, film cameras, video cameras, movie imaging cameras, and the like.

What is claimed is:

1. An imaging optical system consisting of, in order from a magnification side to a reduction side:
a first optical system that has at least one lens and forms an intermediate image at a position conjugate to a magnification side imaging surface; and
a second optical system that has at least one lens and re-forms the intermediate image on a reduction side imaging surface,
wherein the imaging optical system is configured to be telecentric on the reduction side, and
wherein assuming that
a height of a principal ray with a maximum angle of view on a lens surface closest to the magnification side in the second optical system is hkc2,
a height of the principal ray with the maximum angle of view on a lens surface closest to the reduction side in the first optical system is hrc1,
a height of an on-axis marginal ray of the lens surface closest to the magnification side in the second optical system is hkm2, and
a height of the on-axis marginal ray at a position where the principal ray with the maximum angle of view intersects with an optical axis in the second optical system is hs,
Conditional Expressions (1-1) and (2) are satisfied, $$1.9 \leq hkc2/hrc1 < 2.5 \quad (1\text{-}1)$$

$$hkm2/hs < 0.8 \quad (2).$$

2. The imaging optical system according to claim 1, wherein assuming that an absolute value of an angle formed between the principal ray with the maximum angle of view incident on the lens closest to the magnification side in the second optical system and the principal ray with the maximum angle of view emitted from the lens closest to the magnification side in the second optical system is θ where a unit of θ is degrees, Conditional Expression (3) is satisfied, $$14 < \theta \quad (3).$$

3. An imaging optical system according to claim 1, consisting of, in order from a magnification side to a reduction side:
a first optical system that has at least one lens and forms an intermediate image at a position conjugate to a magnification side imaging surface; and
a second optical system that has at least one lens and re-forms the intermediate image on a reduction side imaging surface,
wherein the imaging optical system is configured to be telecentric on the reduction side,
wherein a lens closest to the reduction side in the first optical system is an aspheric lens, and
wherein assuming that
a height of a principal ray with a maximum angle of view on a lens surface closest to the magnification side in the second optical system is hkc2, a height of the principal ray with the maximum angle of view on a lens surface closest to the reduction side in the first optical system is hrc1, a height of an on-axis marginal ray of the lens surface closest to the magnification side in the second optical system is hkm2, a height of the on-axis marginal ray at a position where the principal ray with the maximum angle of view intersects with an optical axis in the second optical system is hs, a focal length of a whole system is f, a height of the principal ray with the maximum angle of view on a magnification side surface of the aspheric lens is yk, a height of the principal ray with the maximum angle of view on a reduction side surface of the aspheric lens is yr, an amount of deviation between the magnification side surface of the aspheric lens and a paraxial spherical surface of the surface in a direction of the optical axis at the height yk is Xk(yk), an amount of deviation between the reduction side surface of the aspheric lens and a paraxial spherical surface of the surface in the direction of the optical axis at the height yr is Xr(yr), and a sign of Xk(yk) is negative in a case where the magnification side surface of the aspheric lens at the height yk is closer to the magnification side than the paraxial spherical surface of the surface and is positive in a case where the magnification side surface is closer to the reduction side than the paraxial spherical surface, and a sign of Xr(yr) is negative in a case where the reduction side surface of the aspheric lens at the height yr is closer to the magnification side than the paraxial spherical surface of the surface and is positive in a case where the reduction side surface is closer to the reduction side than the paraxial spherical surface, Conditional Expression (4) is Expressions (1), (2), and (4) are satisfied, $$1.9 \leq hkc2/hrc1 \tag{1}$$

$$hkm2/hs<0.8 \tag{2), and}$$

$$0<[Xr(yr)-Xk(yk)]/|f| \tag{4}$$

4. The imaging optical system according to any one of claim 1, wherein assuming that a maximum image height on the reduction side imaging surface is Ymax, Conditional Expression (5) is satisfied, $$0.8<Y\text{max}/hrc1<1.5 \tag{5}$$

5. The imaging optical system according to claim 3, wherein Conditional Expression (1-1) is satisfied, $$1.9 \leq hkc2/hrc1<2.5 \tag{1-1}$$

6. The imaging optical system according to claim 1, wherein Conditional Expression (2-1) is satisfied, $$0.4<hkm2/hs<0.7 \tag{2-1}$$

7. The imaging optical system according to claim 2, wherein Conditional Expression (3-1) is satisfied, $$16<\theta<20 \tag{3-1}$$

8. The imaging optical system according to claim 3, wherein Conditional Expression (4-1) is satisfied, $$0.3<[Xr(yr)-Xk(yk)]/|f|<1 \tag{4-1}$$

9. A projection display device comprising:
a light source;
a light valve into which light emitted from the light source is incident; and
the imaging optical system according to claim 1,
wherein the imaging optical system projects an optical image using modulated light, which is modulated through the light valve, onto a screen.

10. An imaging apparatus comprising the imaging optical system according to claim 1.

11. A projection display device comprising:
a light source;
a light valve into which light emitted from the light source is incident; and
the imaging optical system according to claim 3,
wherein the imaging optical system projects an optical image using modulated light, which is modulated through the light valve, onto a screen.

12. An imaging apparatus comprising the imaging optical system according to claim 3.

* * * * *